Aug. 31, 1965

H. O. KESKITALO 3,203,565

VEHICLE MOUNTED LOADER

Filed Sept. 11, 1962

INVENTOR.
HOWARD O. KESKITALO
BY
*Fryer and Gunsvold*
ATTORNEYS

Aug. 31, 1965

H. O. KESKITALO 3,203,565

VEHICLE MOUNTED LOADER

Filed Sept. 11, 1962

INVENTOR.
HOWARD O. KESKITALO
BY
Fryer and Zinvold
ATTORNEYS

Aug. 31, 1965  H. O. KESKITALO  3,203,565
VEHICLE MOUNTED LOADER
Filed Sept. 11, 1962  4 Sheets-Sheet 4

INVENTOR.
HOWARD O. KESKITALO
BY
*Fryer and Zimmold*
ATTORNEYS

United States Patent Office 3,203,565
Patented Aug. 31, 1965

3,203,565
VEHICLE MOUNTED LOADER
Howard O. Keskitalo, Batavia, Ill., assignor to Caterpillar Tractor Co., Peoria, Ill., a corporation of California
Filed Sept. 11, 1962, Ser. No. 222,812
10 Claims. (Cl. 214—140)

This invention relates to a vehicle mounted loader and more particularly relates to a vehicle mounted loader having a side dump bucket arrangement adapted for the loading and unloading of material to either side thereof.

Vehicle mounted earth loaders must often operate in a relatively small working area. Such a working condition has provided the impetus for the provision of buckets therefor which are not only arranged to dump forwardly of the vehicle, but also to one or both sides thereof. Less time is required for repositioning the vehicle for each dumping operation when the bucket is arranged for side dumping.

Conventional side dump bucket arrangements generally necessitate manual actuation of various components to place the loader in condition for a side dumping operation. Furthermore, conventional loaders are generally complex and bulky in nature and do not provide for efficient bucket loading and unloading. There is a further need, during various phases of a material handling operation, that the bucket be securely attached to the supporting cradle to prevent injury to the operaors as well as damage to the loader.

The present invention has overcome many of the above mentioned difficulties by providing a uniquely constructed and arranged vehicle mounted side dump bucket arrangement. Novel aspects of this invention comprise a cradle having a material receiving and unloading bucket arranged thereon for unloading material to one or both sides thereof and first and second bracket members pivotally mounted on first and second end portions of the cradle and operatively connected to the bucket. Means are provided for selectively attaching either of said bracket members to the cradle to prevent pivotal movement thereof relative to the cradle and for simultaneously releasing the other bracket member from the cradle to permit a side tilting of the bracket. Such a means includes actuating means operatively connected to the bracket members for effecting the selective pivoting of the bucket.

An object of this invention is to increase the working efficiency of a vehicle mounted material loader.

Another object of this invention is to provide a side dump bucket arrangement for material loaders which is adapted to pivot a bucket thereof at a maximum reach to either side of the loader.

A further object of this invention is to provide a side dump bucket arrangement for side dump buckets which is automatic in operation and durable in construction.

A still further object of this invention is to provide a side dump bucket arrangement for material loaders which assures that the bucket thereof will be securely attached to a supporting cradle during all phases of an earth moving operation.

Other and more specific objects of this invention will become apparent from the following description taken in connection with the accompanying drawings wherein:

FIG. 5 is an enlarged sectional view taken on line V—V in FIG. 3;

FIG. 6 is an enlarged sectional view taken on line VI—VI in FIG. 3;

FIG. 7 is an enlarged sectional view taken on line VII—VII in FIG. 6;

FIG. 8 is an enlarged fragmentary perspective view disclosing a lost motion feature of this invention; and FIG. 9 is an enlarged sectional view taken on line IX—IX in FIG. 1.

Figure 1:
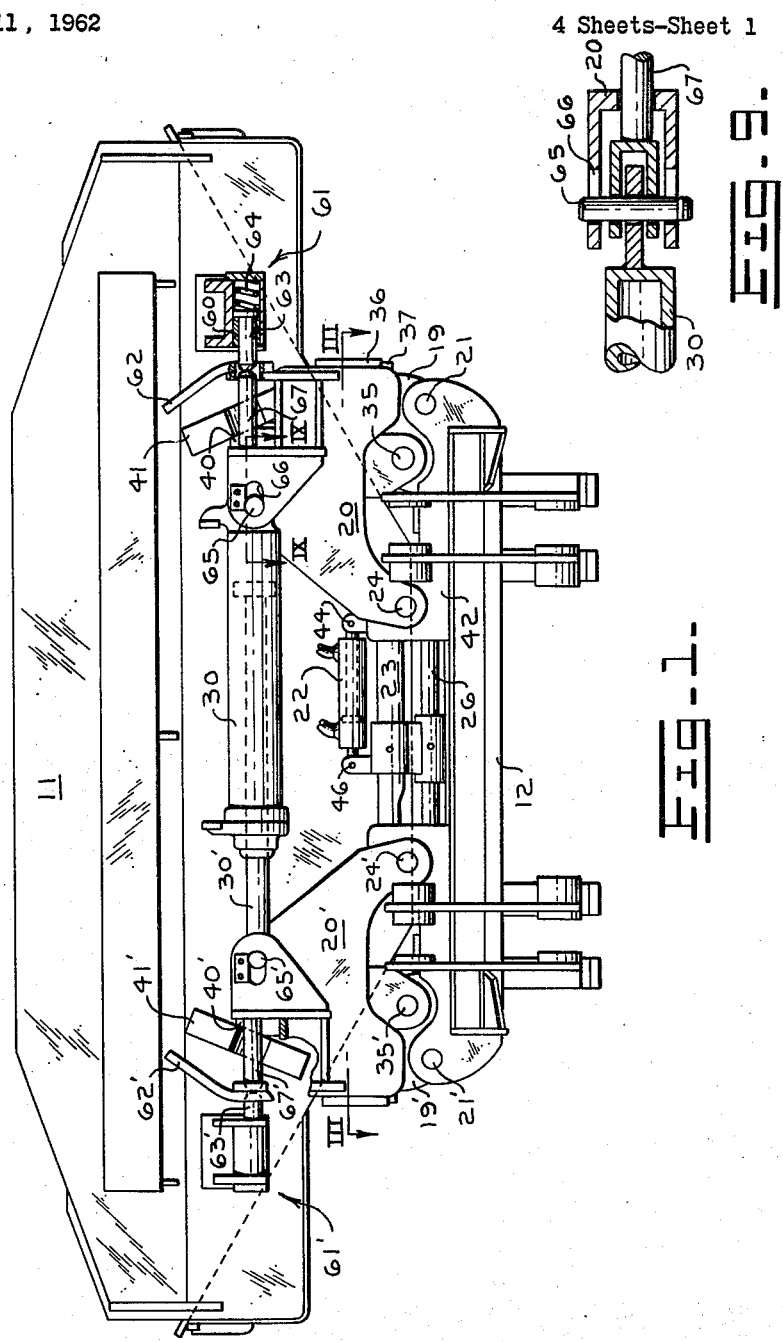
FIG. 1 is a rear elevational view, partly in cross-section, illustrating a side dump bucket arrangement of this invention.
Figure 4:
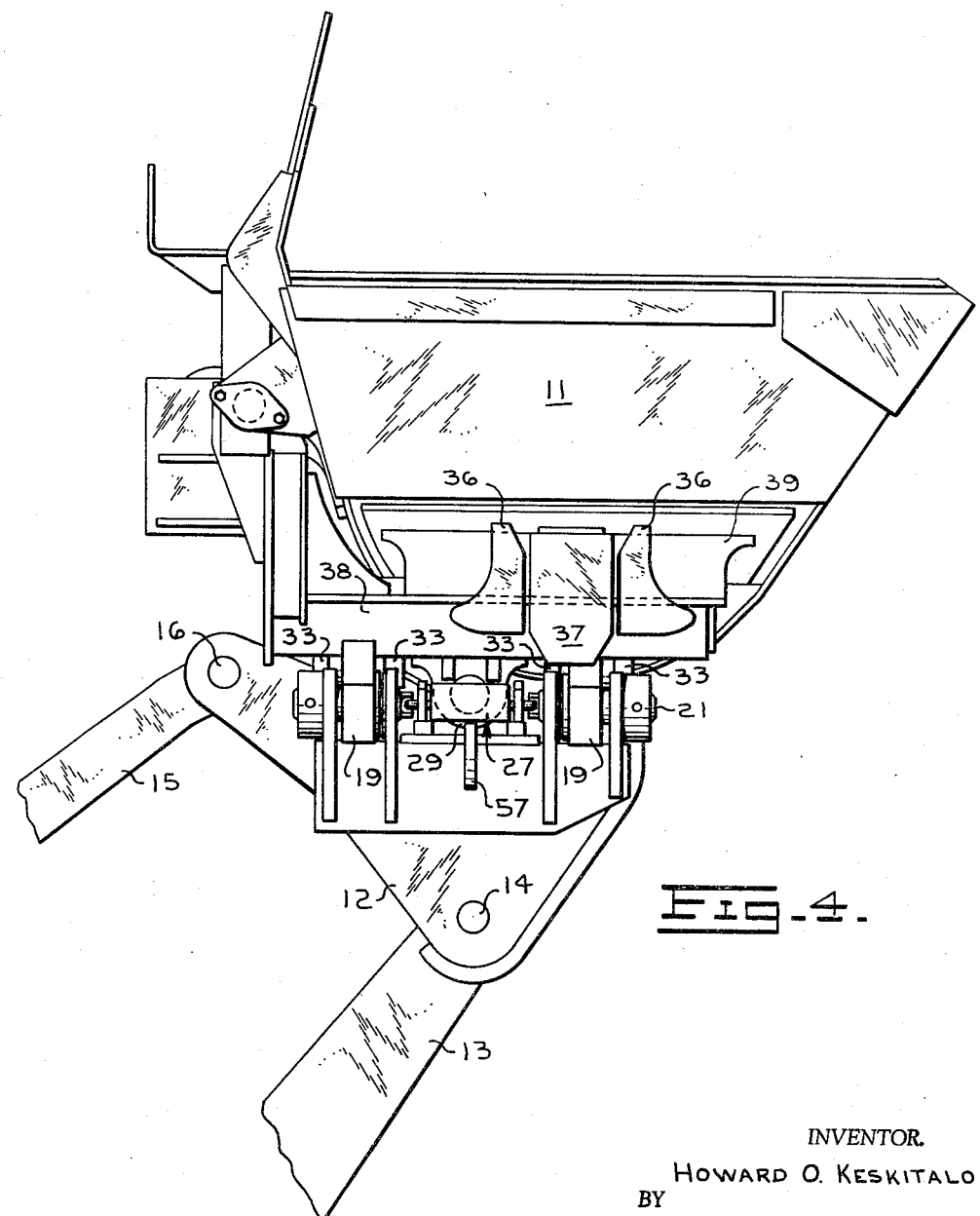
FIG. 4 is a side elevational view of the arrangement shown in FIG. 1.

As shown in FIGS. 1 and 4, this invention comprises a bucket 11 and a cradle 12 supported on laterally spaced lift arms 13 at pivot stub shafts 14. Also, laterally spaced tilt arms 15 are pivotally attached to the cradle by means of pivot stub shafts 16. The sets of arms 13 and 15 may be suitably connected to the actuating means of the tractor (not shown) to impart lifting and/or tilting movements to the cradle in a conventional manner.

Figure 2:
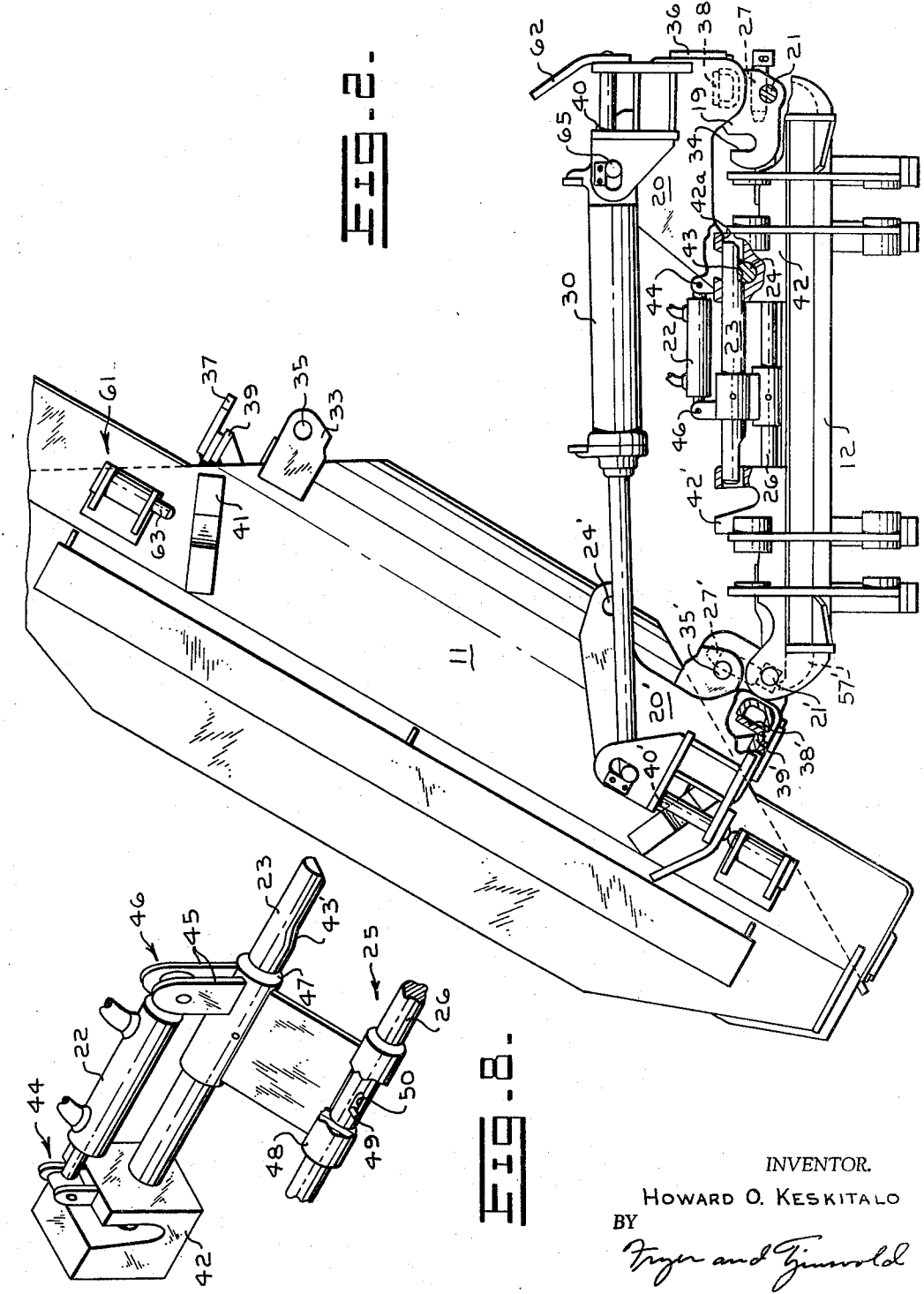
FIG. 2 is a view similar to FIG. 1, but shows the bucket in a side dump position.
Figure 3:
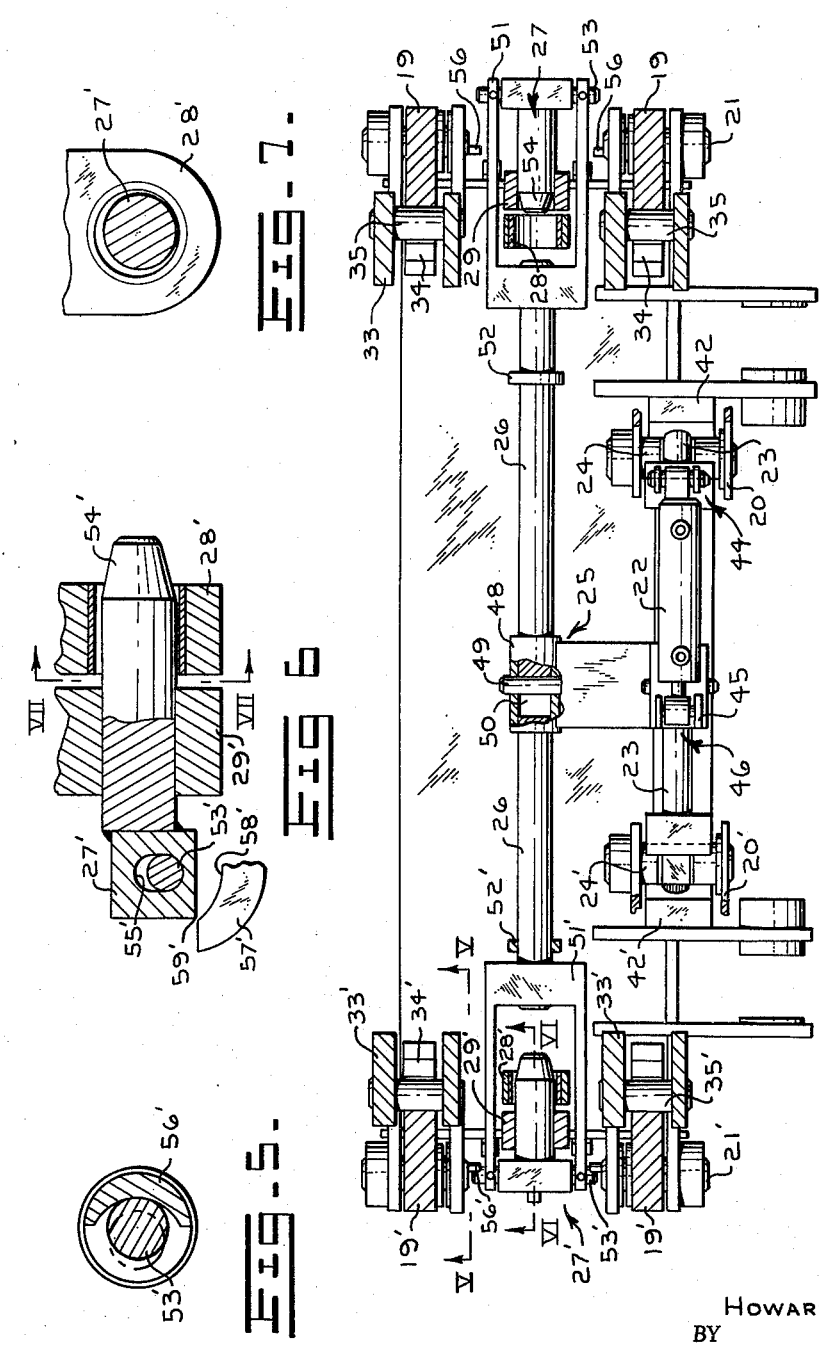
FIG. 3 is a cross-sectional view taken on line III—III in FIG. 1.

Referring more particularly to FIGS. 1 and 3, the side dump bucket arrangement comprises spaced support arms 19 and 19' for the bucket which arms form part of first and second bracket members or assemblies 20 and 20'. The bracket members may be selectively connected to the bucket and are pivotally mounted on first and second end portions of the cradle about pivot pins 21 and 21', respectively. As shown in FIG. 2, for example, a first actuating and locking means comprising a double acting hydraulic jack 22 and cooperating locking rod 23 is provided for selectively attaching one or both of bars 24 and 24' of bracket members 20 and 20', respectively, to the cradle to prevent pivotal movements thereof.

As more clearly shown in FIG. 3, a second locking means comprising a coupling assembly 25 and locking rod 26 are arranged to be responsive to hydraulic cylinder 22 to selectively release one end of the bucket from bracket member 20. The latter function is accomplished due to the fact that when rod 26 is moved in a rightward direction, pin 27 thereof disengages apertured lug 28 of the bucket and is thereafter guided in its movements by apertured lug 29 formed on bracket 20.

Thus, it can be seen from the above brief description that the bucket may be thereafter tilted to the side unloading position of FIG. 2 by an actuating means, preferably in the form of a second double acting hydraulic jack 30, which is operatively connected to the first and second bracket members. Since the bracket member 20 is secured to the cradle during this phase of operation, hydraulic jack 30 will function to pivot bracket member 20' and bucket 11 about pivot pin 21'. As will be hereinafter more fully understood, by selectively shifting the locking rod 23 in an opposite direction to that above described, the bucket may be tilted to an unloading position opposite to that shown in FIG. 2.

The tilting arrangements on each side of the loader are substantially the same and like numerals have accordingly been used therefor. The elements on the left side of the arrangement have prime symbols therefore as shown in FIG. 1, for example. The bracket assembly 20 comprises spaced hook-like extensions 34 (FIG. 2) arranged to seat spaced bars 35 wihch are rigidly secured to the bucket. The bracket assembly further comprises spaced centering guides 36 (FIG. 4) arranged to guide tapered projections 37 on the bucket to prevent side plates 33 from striking hook-like extensions 34 due to substantial lateral movement of the bucket when the bucket is lowered. A cross brace 38 is secured between the spaced arms of the bracket assembly to provide a rigid support for a cross member 39 of the bucket. As will be hereinafter more fully understood, the bracket assembly is further provided with a shoulder 40 (FIG. 1) which is arranged to cooperate with abutment plates 41 of the bucket for side tilting purposes.

As above stated, bar 24 is adapted to lock the bracket assembly to the cradle through its cooperation with slidably mounted locking rod 23 (FIG. 2). An upstanding bracket 42 is secured to the cradle and forms a slotted portion therein which functions as a guide for bar 24. Bracket 42 has an aperture 42a formed therein which is adapted to slidably receive the locking rod. The locking rod has a cut out portion 43 formed thereon which mates with a similar cut out portion of pin 24 for purposes of providing sufficient bearing area therebetween.

As more clearly shown in FIG. 8, the jack 22 is connected to bracket 42 at 44 and to upstanding lugs 45 at 46. A sleeve 47 is secured to rod 23 and forms a part of the coupling assembly 25 which imparts reciprocating movements, responsive to actuation of jack 22, to rod 26 through a lost-motion connection. The lost-motion connection comprises a sleeve 48 secured to sleeve 47 by means of a plate member. Sleeve 48 is slidably mounted on rod 26 and has a pin 49 which is arranged in a lost-motion slot 50 formed in rod 26. Thus rod 26 is adapted to be reciprocated in response to actuation of jack 22.

As shown in FIG. 3, rod 26 has a yoke 51 formed thereon and is slidably supported in upstanding apertured brackets 52 and 52', secured to the cradle. Pin assembly 27 forms a T-shaped member, the tubular portion of which is pivotally mounted on a pivot pin 53 fixed to the yoke. The pin has a tapered end portion 54 which is constructed and arranged to automatically remove itself from partial engagement with apertured lug 28 of the bucket, as will be hereinafter more fully understood.

During the side tilting operation shown in FIG. 2, it is desirable to have the pin assembly 27' constructed and arranged for freedom of movement in the manner more clearly shown in FIG. 6. As more fully discussed below, a lost-motion slot 55' is formed in the tubular portion of the pin assembly to assure that the pin portion thereof will not bend due to minor misalignment of the integrated components. Also, as more clearly shown in FIG. 5, arcuately shaped stop ears 56' may be formed on the cradle to afford a self-centering function when the pivot pin is moved thereagainst. As shown in FIG. 6, a selected tolerance may be provided between the projecting pin portion of the pin assembly and the bracket 28' of the bucket.

The axes of pivot pins 21' and pivot pin 53', as viewed in FIG. 3, are preferably coincident when the bucket and related elements are pivoted therearound. However, should rightward movement of rod 26 be somewhat restricted so as to position the pin 53' in the offset phantom line position shown in FIG. 5, the lost-motion slot 55' formed in pin assembly 27' will afford a sufficient tolerance so as not to restrict the pivotal movements of the pin assembly. Guide blocks 57' are secured to the cradle and arranged as shown in FIG. 6 to provide an arcuate surface portion 58' which acts as a safety stop preventing pin assembly 27' from withdrawing from lug 28' during side dumping operation (FIG. 2).

Referring again to FIG. 1, hydraulic jack 30 may be arranged to initially cooperate with a third locking means 61 which functions to attach the bucket to an apertured bracket 62 of bracket assembly 20. This locking means comprises a latch pin 63 which is biased in a leftward direction by coil spring 64 and limited in its movement by a bushing 60. This construction and arrangement is similar to that shown in FIG. 7 of U.S. Patent No. 2,821,313 to Stanley W. Warner for a Side Dumping Loader.

Apertured bracket 62 has a ramp portion formed thereon adapted to compress latch pin 63 against the biasing effects of coil spring 64 when the bucket is lowered. As more clearly shown in FIG. 9, the piston 30 has a laterally extending pin 65 secured thereto, mounted for sliding movements in a lost motion slot 66 formed in bracket 20. The pin 65 has a push pin 67 pivotally mounted thereon arranged for disengaging the latch pin from the apertured bracket 62 when moved a sufficient distance in a rightward direction.

Operation of the tilting arrangement to tilt the bucket 11 into the side unloading position of FIG. 2 is commenced by actuating hydraulic jacks 22 and 30. With the construction and arrangements hereinbefore described, selective actuation of hydraulic cylinder 22 functions to move the locking rod 23 into the position shown, to lock bar 24 to cradle 12. Subsequent to this first step of operation and due to the lost-motion connection 25 shown in FIG. 8, rod 26 is thereafter moved in a rightward direction, as viewed in FIG. 3, to unlatch the latch pin of the pin assembly 27 from the apertured lug 28 of the bucket. Simultaneously therewith, this rod movement functions to move the latch pin of pin assembly 27' into attached relationship with the apertured lug 28' of the bucket. As stated above, the pivot pin 53' will automatically center itself in the manner more clearly shown in FIG. 5, due to its cooperation with stop ears 56'.

Subsequent or simultaneously with these operational steps, actuation of the hydraulic jack 30 will function to separate the piston rod and cylinder thereof to disengage latch pins 63 and 63' from the apertured bracket members 62 and 62', respectively. A relatively quick disengagement thereat is afforded due to the spherical end portions formed on the extremities of latch pins 63 and 63'. Continued actuation of jack 30 functions to anchor the pin 65 in the right hand extremity of lost-motion slot 66, as shown in FIG. 2, to thus permit the piston rod to tilt the bracket assembly 20' about pivot pin 21'.

As shown most clearly in this figure, shoulder 40' of the bracket engages abutment plate 41' during side dump operation. However, at full side dump, cross member 39' contacts cross brace 38' and prevents further counterclockwise movement of the bucket due to inertia of the bucket and load. Due to the inclined plane arrangement between bearing surface 40' and 41', the maximum tilting forces are imparted to the bucket substantially in the direction of the longitudinal axis of hydraulic jack 30 and are constantly utilized during the entire bucket tilting operation. Also, as hereinbefore described in connection with the pin assembly arrangement shown in FIG. 6, damaging forces are not imparted to pin assembly 27' during this tilting operation.

Operation of the bucket assembly to tip the bucket about pivot pin 21 in FIG. 1 is achieved in a manner substantially the same as that above described. Assuming sufficient biasing force is afforded by springs 64 and 64', jack 30 may comprise a one-way cylinder since the operation thereof for both right and left side dumping is the same. Movement of the locking rod 23 in a leftward direction will function to secure the bracket to the cradle at bar 24' and release the bucket from the bracket assembly 20' at pin assembly 27'. Hydraulic jack 30 will thereafter function to release the latch pin 63' from the apertured bracket 62' to thus release the bucket from the bracket assembly 20' in a manner similar to that hereinabove described.

It should be understood that although this invention has been described and illustrated in terms of a two-way side dump bucket arrangement, that novel concepts of this invention may be used to afford a bucket arrangement which is only adapted to dump to one side. For example, as viewed in FIG. 1, the bracket assembly 20 may be relatively simplified in construction and secured to the cradle 12 to thus provide for dumping only in the direction disclosed in FIG. 2. However, it should be further understood that the more specific novel concepts of this invention constitute employment and cooperation between both bracket assemblies for tilting to either side of the loader.

I claim:

1. A side dump bucket arrangement comprising a cradle having first and second end portions, first and second means movably mounted on said cradle and supporting said bucket on the first and second end portions of said cradle, respectively, and means for selectively moving one of said first or second means into engagement with said bucket and for attaching the cradle to the other of said first or second means whereby said bucket may be selectively tilted at a maximum height about either end portion of said cradle by either the first or second means which is moved into engagement with said bucket.

2. The invention of claim 1 wherein said means comprises a first locking means for selectively locking either said first or second means to said cradle while simultaneously releasing the other therefrom and actuating means operatively connected between said first and second means.

3. A side dump bucket arrangement comprising a cradle having first and second end portions, a bucket arranged on said cradle, first and second members normally supporting end portions of said bucket and pivotally mounted on the first and second end portions of said cradle, respectively, first locking means for selectively locking either said first or second member to said cradle to prevent pivotal movements thereof with respect to said cradle, and for releasing the other of said members from said cradle, and second locking means responsive to said first locking means for releasing said bucket from the member which is selectively locked to said cradle and for locking the bucket to the other of said members whereby said bucket may be tilted about the end portion of the cradle whereat one of said members is released.

4. The invention of claim 3 further comprising actuating means operatively connected between said members for selectively pivoting the member which is not locked to said cradle into engagement with said bucket to impart tilting movements thereto.

5. The invention of claim 4 further comprising third locking means normally locking said bucket, actuating means and members together and responsive to said actuating means for releasing the member which is locked to said cradle.

6. A side dump bucket arrangement comprising a cradle having first and second end portions, a bucket arranged on said cradle, first and second bracket members normally supporting end portions of said bucket and pivotally mounted on the first and second end portions of said cradle, respectively, means for selectively attaching one of said bracket members to said cradle while simultaneously releasing the other of said bracket members therefrom and for subsequently releasing said bucket from the bracket member which is locked to said cradle while simultaneously locking said bucket to the other of said bracket members and actuating means operatively connected to said bracket members for selectively tilting the bracket member which is released from said cradle into tilting engagement with said bucket.

7. A side dump bucket arrangement comprising a cradle having first and second end portions, first and second bracket assemblies pivotally mounted on the first and second end portions of said cradle, respectively, a bucket releasably supported on said first and second bracket assemblies, a first lock bar slidably mounted on said cradle and arranged between said bracket assemblies to be selectively moved to engage therewith to lock one or both of said bracket assemblies to the cradle, actuating means operatively connected to said cradle and said first lock bar for selectively moving said first lock bar, a second lock bar slidably mounted on said cradle and operatively connected to said first lock bar to receive movements therefrom in response to actuation of said actuating means and means arranged on end portions of said second lock bar and on said bucket for selectively releasing the bucket from the end portion of said cradle whereat one of said bracket assemblies is locked to said cradle.

8. The invention of claim 7 further comprising a second actuating means operatively connected between said bracket assemblies for selectively pivoting the bracket assembly which is not locked to said cradle into engagement with said bucket to impart tilting movements thereto.

9. The invention of claim 8 further comprising locking means operatively associating said second actuating means, said bracket assemblies and said bucket for releasing the end portion of the bucket which is adjacent to the bracket assembly which is secured to the cradle in response to actuation of said second actuating means.

10. A side dump bucket arrangement comprising a cradle having first and second end portions, a bucket arranged to be normally supported on said cradle, first and second bracket assemblies releasably supporting end portions of said bucket thereon and pivotally mounted on the first and second end portions of said cradle, respectively, abutment plates formed on said bucket and arranged to engage said bracket assemblies when they are tilted, a first locking rod slidably mounted on said cradle and arranged to be moved into overlying relationship with respect to bar members formed on said bracket assemblies, a first hydraulic jack connected between said cradle and said locking rod for selectively locking either of said bracket assemblies to said cradle, a second locking rod slidably mounted on said cradle and having pin assemblies pivotally mounted on the ends thereof, arranged to slidably engage apertured lugs formed on the end portions of said bucket, a lost-motion connection operatively connecting said first and second locking rods and arranged therewith to release said bucket from one of said bracket assemblies with said second locking rod subsequent to a locking of the last-mentioned bracket assembly to said cradle and a second hydraulic jack operatively connected between said first and second bracket assemblies and arranged to pivot the bracket assembly which is not locked to said cradle by said first locking rod into tilting engagement with one of the abutment plates of said bucket.

References Cited by the Examiner

UNITED STATES PATENTS

| | | | |
|---|---|---|---|
| 2,047,051 | 7/36 | Armington et al. | 298—18 |
| 2,631,745 | 3/53 | Addison | 214—140 |
| 2,821,313 | 1/58 | Warner | 214—140 |
| 3,022,910 | 2/62 | Anderson et al. | 214—140 |
| 3,111,235 | 11/63 | Holtermann. | |
| 3,144,147 | 8/64 | Boughton. | |

HUGO O. SCHULZ, *Primary Examiner.*